(12) United States Patent
Chakraborty et al.

(10) Patent No.: US 12,547,814 B1
(45) Date of Patent: Feb. 10, 2026

(54) CONTROL OF LOW-POWER CHECKERS USING ASSERTION CONTROL TECHNIQUES OF ASSERTIONS LANGUAGE

(71) Applicant: Synopsys, Inc., Mountain View, CA (US)

(72) Inventors: Subhrajyoti Chakraborty, Bengaluru (IN); Harsh Chilwal, San Jose, CA (US); Debraj Dutta, Sunnyvale, CA (US); Vishal Rathi, Sunnyvale, CA (US)

(73) Assignee: Synopsys, Inc., Sunnyvale, CA (US)

( * ) Notice: Subject to any disclaimer, the term of this patent is extended or adjusted under 35 U.S.C. 154(b) by 649 days.

(21) Appl. No.: 17/982,043

(22) Filed: Nov. 7, 2022

(51) Int. Cl.
*G06F 30/398* (2020.01)
*G06F 1/28* (2006.01)

(52) U.S. Cl.
CPC .............. *G06F 30/398* (2020.01); *G06F 1/28* (2013.01)

(58) Field of Classification Search
CPC ...... G06F 1/324; G06F 1/3296; G06F 16/182; G06F 30/27; G06F 1/3203; G06F 1/26; G06F 1/28; G06F 1/3243; G06F 2212/1028; G06F 1/30; G06F 1/3287; G06F 3/0625; G06F 30/398; G06F 1/325; G06F 1/3253; G06F 1/3275; G06F 1/3278; G06F 30/30; G06F 30/33; G06F 30/3308; G06F 30/3312; G06F 30/3315; G06F 30/367; G06F 12/1009; G06F 30/333; G06F 2119/06; G06F 12/0815; H01L 2224/48227; H01L 2225/0651; H01L 2225/06527
USPC .................................. 716/133–136, 132–135
See application file for complete search history.

(56) References Cited

U.S. PATENT DOCUMENTS

| | | | | |
|---|---|---|---|---|
| 8,868,941 B2 * | 10/2014 | Jayasimha | ............ | G06F 1/3287 713/320 |
| 2014/0013293 A1 * | 1/2014 | Hsu | ......................... | G06F 30/33 716/133 |
| 2017/0228481 A1 * | 8/2017 | Pusuluri | ................ | G06F 30/392 |

* cited by examiner

*Primary Examiner* — Binh C Tat
(74) *Attorney, Agent, or Firm* — Lowenstein Sandler LLP

(57) ABSTRACT

A computer-implemented method for validation of a low-power design for an electronic circuit. The method includes accessing, by a processing device, the low-power design of the electronic circuit including one or more low-power elements. The method further includes selecting, from the design of the electronic circuit, a domain and a power activity, and enabling an assertion component configured to control the one or more low-power elements in the domain, the low-power elements performing the power activity.

18 Claims, 7 Drawing Sheets

CONTROL OF LOW-POWER CHECKERS USING ASSERTION CONTROL TECHNIQUES OF ASSERTIONS LANGUAGE

TECHNICAL FIELD

The present disclosure relates to electronic design automation. More specifically, embodiments disclosed herein relate to providing finer control of low-power checkers using assertion control techniques of assertions language.

BACKGROUND

A "low-power" design is a collection of techniques and methodologies aimed at reducing the overall dynamic and static power consumption of an integrated circuit (IC). One of the goals of a low-power design is to reduce the individual components of power as much as possible, thereby reducing the overall power consumption. The power equation for overall power consumption contains components for dynamic and static power. Dynamic power is comprised of switching and short-circuit power, whereas static power is comprised of leakage, or current that flows through the transistor when there is no activity. The value of each power component may be related to factors such as activity, frequency, transition time, capacitive load, voltage, leakage current, and peak current.

For example, the higher the voltage, the higher the power consumed by each component, resulting in higher overall power. Conversely, the lower the voltage, the lower the overall power. To achieve the best performance with the lowest power consumption, tradeoffs for each of these different factors are tried and tested via various low-power techniques and methodologies.

SUMMARY

One embodiment is a computer-implemented method for validation of a low-power design for an electronic circuit. The method includes accessing, by a processing device, the low-power design of the electronic circuit including one or more low-power elements. The method further includes selecting, from the design of the electronic circuit, a domain and a power activity. The method further includes enabling or disabling a low-power checker configured to control the one or more low-power elements in the domain, the low-power elements performing the power activity. The one or more low-power elements may include a unified power format (UPF) object such as an isolation element, a retention element, a power switch, a power state table, or a power domain. The electronic circuit may include a system-on-chip (SoC) and/or an IP module.

The method further includes configuring, by the processing device, the low-power checker to monitor a change in value of one or more signals from the one or more low-power elements, and generating a low-power assertion when a predefined criterion is met. The predefined criterion may include the change in value resulting in the processing device using a predetermined amount of memory space, a predetermined amount of processing time, or a predetermined amount of processing power. The low-power assertion can be described in System Verilog Assertions (SVA), VHDL, Verilog, SystemC, MyHDL, Property Specification Language (PSL), or Open Verilog Library (OVL). The low-power assertion may include at least one of lock, unlock, on, off, kill, passOn, passOff, failOn, failOff, vacuousOff, or NonvacuousOff. The method may further include enabling, by the processing device, the low-power checker in a power domain during a first power activity, and disabling the low-power checker in the power domain during a second power activity.

Another embodiment is a non-transitory computer-readable medium storing program instructions executable by a processing device, causing the processing device to perform operations including accessing a low-power design of an electronic circuit including one or more low-power elements. The operations further include selecting, from the design of the electronic circuit, a domain and a power activity, and enabling or disabling a low-power checker configured to control the one or more low-power elements in the domain, the low-power elements performing the power activity. The one or more low-power elements may include a unified power format (UPF) object such as an isolation element, a retention element, a power switch, a power state table, or a power domain. The operations further include configuring, by the processing device, the low-power checker to monitor a change in value of one or more signals from the one or more low-power elements, and generating a low-power assertion when a predefined criterion is met. The predefined criterion may include the change in value resulting in the processing device using a predetermined amount of memory space, a predetermined amount of processing time, or a predetermined amount of processing power.

Another embodiment is a computer-implemented method for assisting verification of a design of an electronic circuit. The method may include coupling, by a processing device, a low-power assertion (LPA) checker to one or more low-power elements in the design of the electronic circuit. The LPA checker may be configured to control the one or more low-power elements using a low-power assertion. The method may further include configuring the LPA checker to monitor a change in value of one or more signals from the one or more low-power elements, and generating the low-power assertion when a predefined criterion is met. The predefined criterion may include the change in value resulting in the processing device using a predetermined amount of memory space, a predetermined amount of processing time, or a predetermined amount of processing power.

BRIEF DESCRIPTION OF THE DRAWINGS

The disclosure may be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
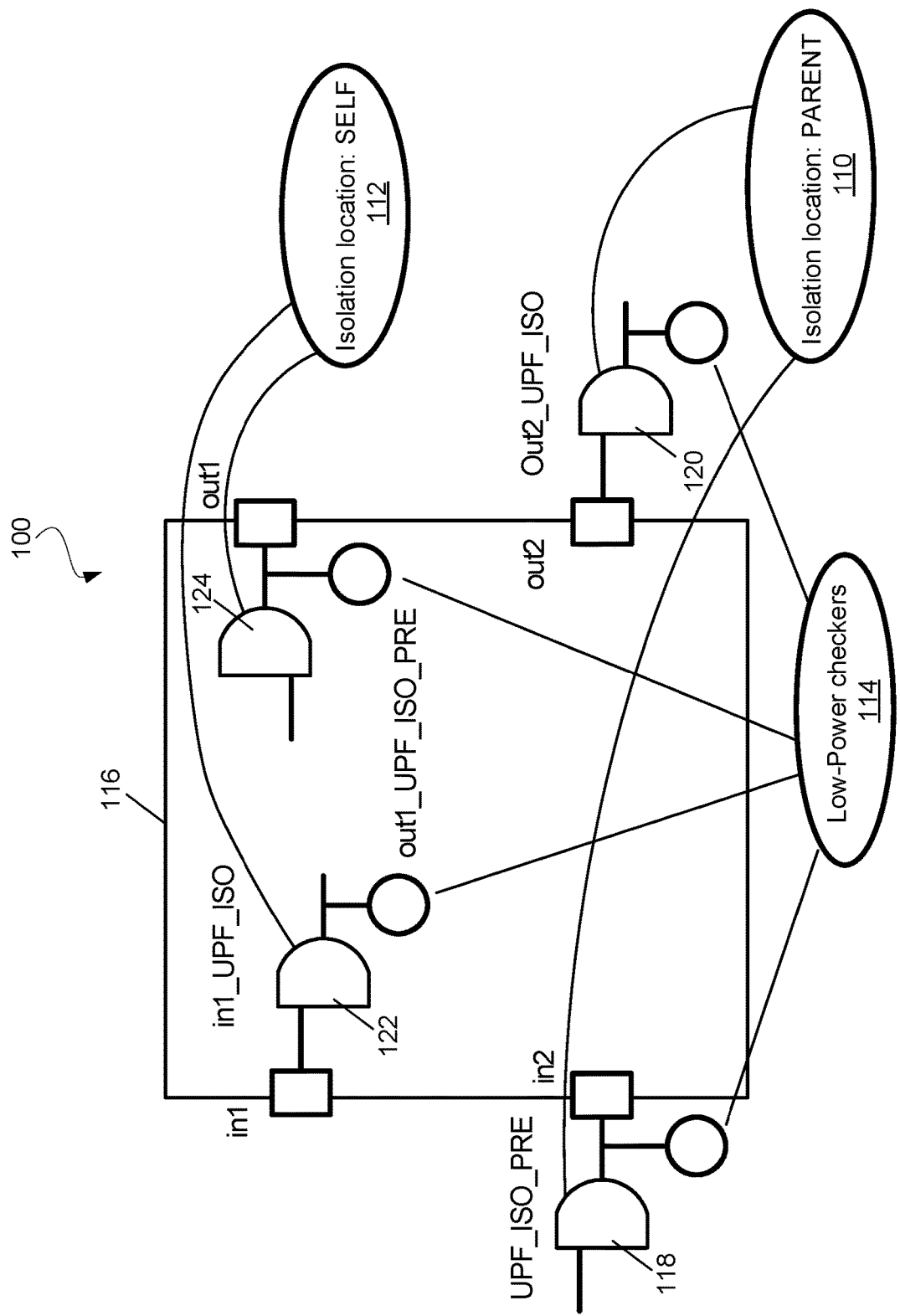
FIG. 1 illustrates a low-power design of an integrated circuit (IC), in accordance with an embodiment of the present disclosure.

Effective verification of low-power designs has been a challenge for many years. Verifying the low-power intent of the design using System Verilog (SV) assertions is not straightforward because of the fact that there is disconnect between the traditional register transfer level (RTL) and low-power objects. Users are unable to access and manipulate the low-power objects in the same way as they do for RTL. Various tool-generated low-power assertions have been developed to dynamically verify the design. Often these tool-generated assertions do not suffice the user's need and there is a requirement for additional checks. Users have also adopted various approaches to write assertions in a checker module, which are referred to herein as "low-power assertion (LPA) checkers." Assertions in the checker module are primarily used to validate the behavior of a design. An assertion may be defined as a verification code that monitors a design implementation for compliance with the specifications, and the checker module generates an assertion whenever the design matches (or fails) a predetermined criteria. One of these approaches is to access the low-power objects using Unified Power Format (UPF) commands and bind these checker modules into the design. However, as these checker modules are written and compiled along with the design, they have to undergo the whole simulation process. Even a simple task of adding more assertions involves re-iteration of the whole low-power simulation flow, which is highly time inefficient specially when the simulations are run for larger system-on-chips (SOCs).

In the low-power flow of current simulation tools, there is a provision to permanently shut off such LPA checkers during simulation using a checker utility, for example. The checker utility maps user intent to a hierarchical path (up to the checker instance), generates an assert file, and feeds the assert file back to the VCS® engine. However, this provision does not offer the flexibility to control the individual assertions during a simulation, and it involves performing a design path resolution at runtime, which can be error prone and time consuming. Another way to control individual assertions during a simulation is via a unified command line interface (UCLI); however, even in a UCLI based flow, accessing checkers residing inside a power network hierarchy may require the user to have internal implementation details of VCS® native low-power (NLP®). It also requires LPA checkers to be either full ON or full OFF during the entire simulation duration. Therefore, a user is unable to selectively turn ON or turn OFF the individual LPA checkers at any chosen time during a simulation, and thus there is a need to have the capability for a finer control on such LPA checkers without the need for enabling debug caps.

The present disclosure relates to methods and systems for performing an effective verification of a low-power design by selectively enabling or disabling LPA checkers on low-power objects in the low-power design. The method includes coupling LPA checkers to low-power objects in the low-power design and generating an assertion when a change in the low-power design results in a predetermined amount of memory space, a predetermined amount of processing time, or a predetermined amount of processing power. Using the disclosed methods, a user (e.g., a verification engineer) is able to select a type of LPA checker, a domain, a power activity, and/or a simulation period, and enable or disable the LPA checker to perform an effective verification of the low-power design. In one embodiment, the LPA checkers can be added using an assertion file, and the user can bind the ports of the assertions with the ports of the RTL in the test bench code. The bind directive can be specified in a module, an interface, and/or a compilation unit. The assertions may include clock domain assertions, module assertions, block level device under test (DUT) assertions, top level DUT assertions, interface assertions, and test bench assertions.

Advantages of the present disclosure include, but are not limited to, the ability to selectively enable (or disable) specific LPA checkers in certain domains during selected power activities and to selectively disable (or enable) the same LPA checkers in those domains during some other power activity. Additionally, a particular type of checker(s) (e.g., isolation or retention or power-switch or power-state-table or power-domain, etc.) can be utilized while the rest of the checkers are disabled for a specific domain during a certain power activity, and then enabled in the same (or different) domain during a different (or same) power activity at a different (or same) simulation time. Other advantages include the ability to select a type of checker, a domain, a power activity, a simulation period, and selectively enable or disable the checker to perform an effective verification of a low-power design. The methods and systems disclosed here can be integrated into the Synopsys® VCS® simulation tool, for example, or other simulation tools.

Turning now to FIG. 1, illustrated is an example implementation of a low-power design 100 of an electronic circuit (e.g., an integrated circuit (IC)) with finer control of low-power checkers using assertion control techniques of System Verilog Assertions (SVA) language, according to some embodiments of the present disclosure. The term "low-power" as used herein refers to low-power as defined under the Unified Power Format (UPF) of the latest Institute of Electrical and Electronics Engineers (IEEE) 1801 standard, a standard used for specifying power intent in power optimization of electronic design automation (EDA). The electronic circuit may be that of a system-on-chip (SoC) and/or an IP module. The SoC may include different components which are often referred to as IP modules. Examples of IP modules include processors (e.g., microprocessor, microcontroller, digital signal processor, video processor, audio processor, specialized co-processors, etc.) or components or functions of processors (e.g., Wallace tree, multiplier, BitBlit which is a graphics operation that merges two bit-map images, etc.), memories and memory management unit (including cache, flash controllers, content addressable memory, or other types of dedicated data storage), and input/output and communication components (e.g., USB, PCIE, I2C, SATA, wireless, Ethernet, peripherals drivers, etc.).

The low-power design 100 may include parent isolation locations 110 and self isolation locations 112. Parent isolation locations 110 may include a low-power element 118 (e.g., a low-power AND gate, multiplexer, flip-flop, or register), which may provide an input signal in2, and another low-power element 120 (e.g., a low-power AND gate, multiplexer, flip-flop, or register), which may provide an output signal out2. The self isolation locations 112 may include a low-power element 122 (e.g., a low-power AND gate, multiplexer, flip-flop, or register), which may provide an input signal in1, and another low-power element 124 (e.g., a low-power AND gate, multiplexer, flip-flop, or register), which may provide an output signal out1 in a power domain 116 with a heterogeneous fanout. Power domain 116 is a collection of gates powered by the same power and ground supply, and can be switched on or off at the same time. Power domain 116 may be used to enable or disable power to a region of the SoC. Each of the low-power elements 118, 120, 122, 124 may be coupled with a separate low-power assertion (LPA) checker 114 configured to monitor a change in value of one or more signals from the low-power elements 118, 120, 122, 124. The LPA checker 114 may be configured to generate a low-power assertion when a predefined criterion is met. In one example, the predefined criterion may include the change in value of one or more signals from the low-power elements resulting in a processor executing the low-power design using a predetermined amount of memory space. For example, a change in value of one or more signals from the low-power elements may result in the processor using up much more memory than the process originally requires. In another embodiment, the predefined criterion may include the change in value of one or more signals from the low-power elements resulting in a predetermined amount of processing time (e.g., the processor takes longer to perform a specific process than it should ideally take). In another embodiment, the predefined criterion may include the change in value of one or more signals from the low-power elements resulting in a predetermined amount of processing power (e.g., the processor uses more compute power to perform a specific process than it should ideally take). Here, the low-power assertion checkers 114 can be added either inside the design 100 or inside the power controller hierarchy (e.g., Power Network Model (PNM)). Similarly, the parent and self isolation locations 110, 112 can be a power domain with heterogeneous fanout and can include other components in between the two locations, and do not have to be immediate instances, as illustrated. At the physical level a "power domain" may include a set of (regular) physical gates with a single power and a single ground rail connecting to the same pair of power and ground nets. The nets are driven by the physical gates. The power domain may also include a set of special gates such as level shifter cells, state retention cells, isolation cells, power switches, always-on cells, or multi-rail hard macros (e.g., I/Os, memories, etc.) with multiple power and ground rails. At least one pair of the power or ground rails in these special gates or macros may be connecting to the same pair of power and ground nets as the (regular) physical gates connect to. At the logic level a power domain may include a set of logic gates that correspond to the (regular) physical gates of this power domain. The nets are driven by these logic gates. The power domain may also include a set of special gates such as level shifter cells, state retention cells, isolation cells, power switches, always-on cells, or multi-rail hard macros (e.g., I/Os, memories, etc.) that correspond to the physical implementation of these gates in this power domain. At register transfer level (RTL) a power domain may include the computational elements (e.g., operators, process, function, and conditional statements) that correspond to the logic gates in this power domain, and the signals that correspond to the nets driven by the corresponding logic gates.

In one embodiment, the low-power design may include a clock gating feature. This technique is typically performed during logic synthesis where enable flops are optimized into a clock gating structure, thereby saving mux area and reducing the overall switching activity of the clock net. With respect to the power equation, one of the goals of a clock gate is to reduce capacitive load (via area reduction) and activity factors which reduces the switching power component of dynamic power.

In another embodiment, the low-power design may include a multi-voltage features where functions of a chip are partitioned via performance characteristics (e.g., one block is high performance, while the rest of the chip is lower performance). To achieve a goals for the high-performance block, a higher voltage is typically required; while to save power on the lower performance blocks, a lower voltage can be used. This is in lieu of designing the entire block at the higher voltage, which is simpler but more power intensive. In the power equation, voltage is reduced which decreases every static and dynamic power component. With multi voltage designs, there is the complication of designing in separate voltage islands where voltage crossings between islands may require "Level Shifter" (LS) cells with the need to implement and analyze the blocks at their different voltage characteristics.

In yet another embodiment, the low-power design may include a power gating feature where functions on an IC are also partitioned, much like multi voltage, but the power supplies for the power domains are connected to power switches. Power gating effectively shuts off the power completely for a block. In the power equation, this zeros out the voltage and shuts off power, resulting in both static and dynamic savings for the time that the block is turned off. Power gating typically offers the most aggressive power savings, and thus it's an ideal goal to shut off as many domains as possible, as often as possible, while maintaining functionality. In order to achieve this power savings with power gating, power switches can be implemented in the low-power design, which requires Isolation gates that clamp the boundaries of the power domain to known values when off. The power states of the design and what combination of ON/OFF states for given voltages can be considered. Lastly, a power management unit (PMU) that controls the power switch and isolation enable signals can be implemented. It is essential that the order of these signals are correct during power down and power up, such that the values during shutdown are clamped to the right values at the right time.

In another embodiment, the low-power design may include a retention with power gating feature. Retention (or register retention) is a technique used along with power gating. Here in each shutdown block, when the block is OFF, either a subset of the flops or all the flops in the block have their previous values saved. When the block powers on, then the previously saved values will be restored. It is important to save the state of the block at the time it is powered off so that the block can quickly restore its previous state instead having to cycle through from an INIT state to the current state. This saves power by reducing the time and steps necessary to get the saved state, as well as improves the overall ramp up time to restore the previous functionality of the block. In addition to everything needed for power gating, retention flops may exist in the library that can map to the desired registers in the RTL. SAVE/RESTORE signals will need to be added to the PMU along with the control the sequence of these signals in addition to those done for power gating.

The low-power design may include other advanced features, including the combination of the techniques previously described. Blocks that use a lower voltage with power gating and have isolation, retention, and level shifters are commonly seen in many modern-day chips. Well biasing, zero-pin retention flops, specialized low-power library cells, dynamic voltage and frequency scaling (DVFS), adaptive voltage and frequency scaling (AVFS), and custom design are just some of the other advanced low-power techniques that also may be used in the low-power design.

In some embodiments, the low-power objects may include one or more retention elements (e.g. retention cells). A retention element may include a memory such that memory values can be preserved during the power-down state of the primary supplies. The low-power objects may also one or more isolation elements. An isolation element (e.g., an isolation cell) is an instance that passes logic values during normal mode operation and clamps its output to some specified logic value when a control signal is asserted. An isolation element may be required when the driving logic supply is switched off and the receiving logic supply is still on. The low-power objects may also include one or more power switches. A power switch is, for example, an instance that translates signal values from an input voltage swing to a different output voltage swing. The low-power objects may also include one or more power states. For example, a power state is the state of a supply net, supply port, supply set, or power domain. It is an abstract representation of the voltage and current characteristics of a power supply, and also an abstract representation of the operating mode of the elements of a power domain or of a module instance (e.g., on, off, sleep). Additionally, the low-power objects may include one or more power domains. A power domain is a collection of HDL module instances and/or library cells that are treated as a group for power management purposes. The instances of a power domain typically, but do not always, share a primary supply set and typically are all in the same power state at a given time. This group of instances may be referred to as the extent of a power domain.

Figure 2:
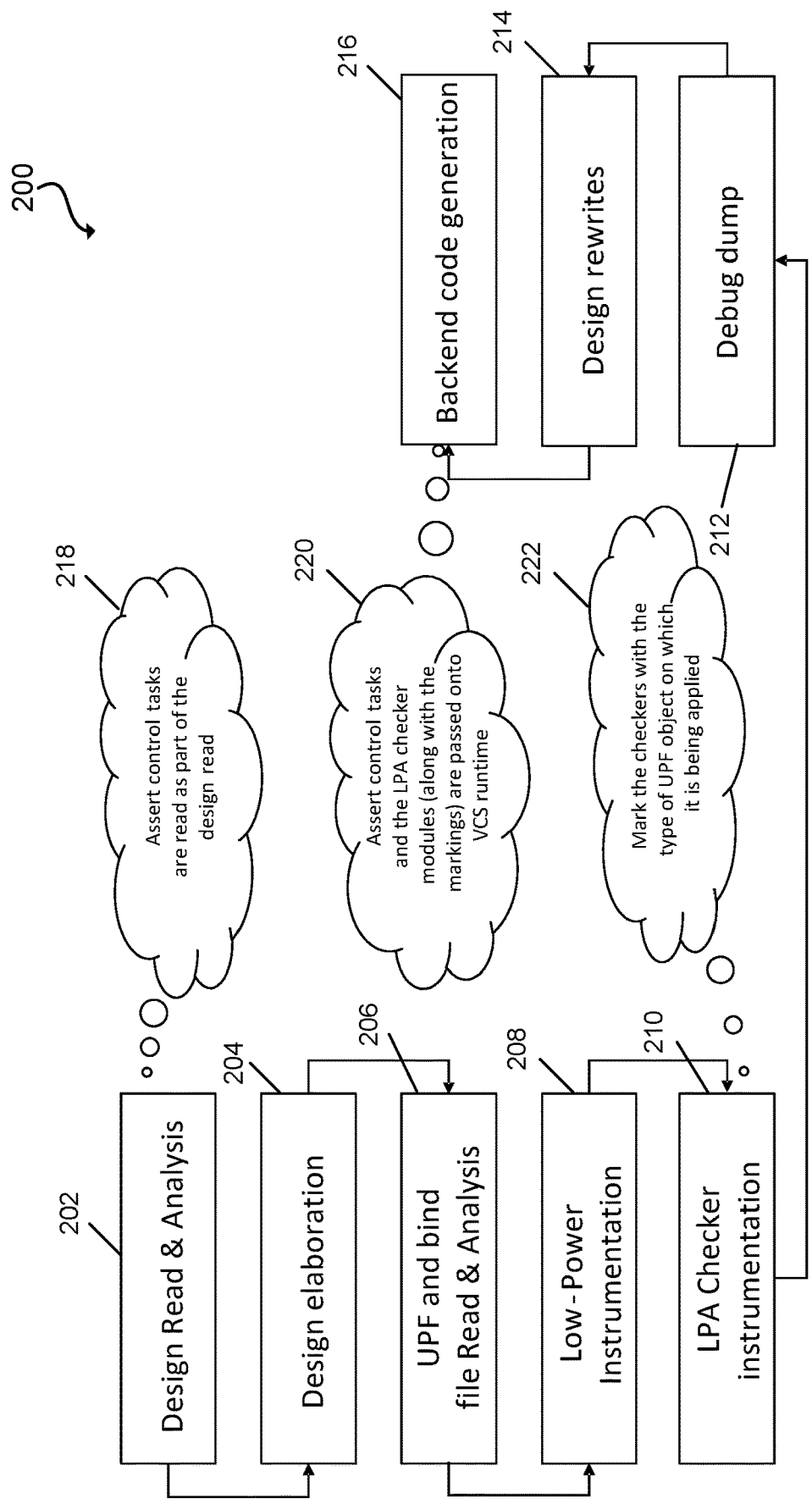
FIG. 2 illustrates example compile time actions in a computer-implemented method for assisting verification of a low-power design of an electronic circuit, in accordance with an embodiment of the present disclosure.

FIG. 2 illustrates example compile time actions 200 in a computer-implemented method for assisting verification of a low-power design of an electronic circuit, in accordance with an embodiment of the present disclosure. The first operation 202 involves reading the low-power design and performing analysis of the low-power design. In this operation, one or more assert control tasks, which will be described in further detail below, are read as part of the design read, as shown in step 218. The next operation 204 involves design elaboration. Design elaboration is a step in simulation where a folded hierarchical Verilog design is flattened to create an instance level view of the design. Applying configuration, binds, overrides, cross module reference resolution, type collapse, and module splitting are some examples of tasks involved in design elaboration. At operation 206, the UPF and bind file including the assertions are read and analyzed. At operation 208, low-power instrumentation is provided, which may include adding one or more low-power elements or unified power format (UPF) objects such as an isolation element, a retention element, a power switch, a power state table, or a power domain. At operation 210, LPA checker instrumentation including one or more LPA checkers is included. In this operation, the processing logic marks the LPA checkers with the type of UPF object (e.g., an isolation element, a retention element, a power switch, a power state table, or a power domain) on which the LPA checker is being applied, as illustrated in step 222.

At operation 212, the processing logic performs a debug "dump." In order to enable a user to debug the design during simulation, the tool generates a view of the design before any tool rewrite takes place. This may give an uncluttered view of the design to the user by abstracting away the internal details of optimization done by the tool. At operation 214, the processing logic performs design rewrites, and at operation 216, the processing logic generates the backend code where the assert control tasks and the LPA checker modules along with the markings (associating the LPA checkers with the type of UPF object) are passed onto the VCS® runtime. In static verification, the first step is to ensure the inputs to the design flow (RTL, UPF, and standard design constraints (SDC)) are structurally and syntactically correct. By definition, static verification doesn't use test vectors, so this is a very efficient way to review inputs before going into simulation or implementation flows. SDC checks are important in general to ensure the RTL is without errors. UPF checks can be done either independently or with the corresponding RTL to ensure they are without errors and SDC can also be statically checked along with RTL as well. In power exploration, early estimates for power for the RTL can be driven, either with estimated switching or actual waveforms from simulation. Choices can be made early on to improve the overall architecture of the design by performing early RTL power analysis.

In dynamic power verification, there are several important aspects to check. First off, does the sequence for the PMU control signals work correctly to shut down, clamp for isolation, save, restore, remove isolation clamp, and power up. This is an extremely important check with the design RTL and UPF together to make sure the design is functioning properly. Next, the type of waveforms and toggle activity seen in the design may determine the dynamic power used since it depends on activity factor. The higher the activity factor, the more power is being used. Hence, the waveforms produced are very important to accurately estimate power both early and late in the process. For emulation-based low-power flows, it is important to be able to capture the right peak windows for the design's power profile. Emulation allows review of a much wider set of data, enabling one to choose the windows that would be most valuable to generate waveforms to estimate power.

In the low-power design, RTL-based predictive power estimation, logical synthesis, design for testability (DFT) insertion and physical implementation can all have important low-power specific roles to play. RTL-based predictive power estimation allows, very early on, to make RTL modifications with early power estimates. In logic synthesis, the RTL, SDC, and UPF, now fully verified both statically and dynamically, are mapped to technology gates. Power-specific isolation, level shifter, and retention cells are mapped to gates as well, where timing, area and power are all part of the cost function for generating a netlist and associated UPF. A netlist is a description of the connectivity of an electronic circuit. In its simplest form, a netlist consists of a list of the electronic components in a circuit and a list of the nodes they are connected to. DFT insertion occurs as well, often simultaneously during this time. Once the netlist and UPF are complete, another round of checks is done statically and dynamically at this level-once clean, the results are input to physical Implementation. In physical implementation, floor planning is done with macro placement and power routing in mind. Then placement is performed where power switches are physically inserted and placed; and iterations of placement, routing estimation, logical optimizations, and clock tree synthesis are performed to once again trade off for timing, area, and power. Finally, the routing step occurs, where pre-route of the priority signals (clock, power enables, switch connections) is done followed by detailed routing of the rest of the design-all with emphasis on reducing power more granularly, while still trying to meet the timing and area targets.

In a subsequent operation, UPF consistency is checked during signoff with the netlist and UPF from logic synthesis and PGNetlist and UPF from physical implementation. The PGNetlist consists of the power and ground networks associated with different voltage domains respectively. In a digital flow, the circuit elements are typically standard cells, or other hard intellectual property (IP) macros, such as register files or memory blocks. This will ensure that the connections and changes made to the netlist and UPF are consistent and clean, and the power intent is preserved. Logical equivalence checks comparing RTL and UPF vs. Gates and UPF vs. PGNetlist and UPF ensures the logical functionality is preserved. Finally, static timing analysis should be performed with UPF to ensure the design meets timing; and power analysis with detailed waveform behaviors to give accurate power estimation results.

Figure 3:
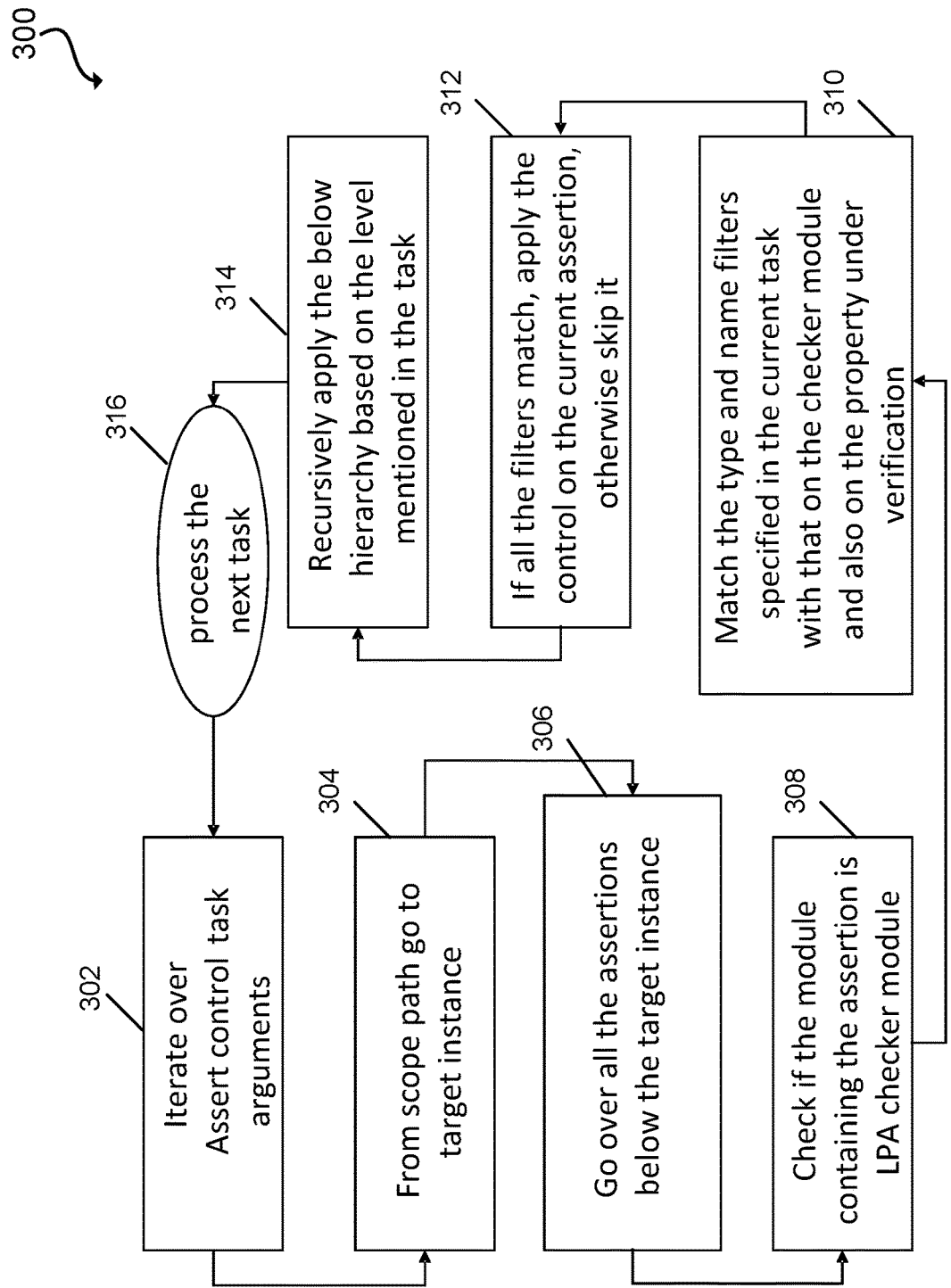
FIG. 3 illustrates example runtime actions in a computer-implemented method for assisting verification of a low-power design of an electronic circuit, in accordance with an embodiment of the present disclosure.

FIG. 3 illustrates example runtime actions 300 in a computer-implemented method for assisting verification of a low-power design of an electronic circuit, in accordance with an embodiment of the present disclosure. At operation 302, the processing logic iterates over the assert control task arguments, which are described in further detail below. At operation 304, the processing logic goes from scope path to target instance or the low-power object (e.g., a power domain). At operation 306, the processing logic processes all the assertions below the target instance or the low-power object. It should be noted here, however, that the operation 306 can be different for location parent and fanout due to tool optimization. At operation 308, the processing logic checks if the module containing the assertion is an LPA checker module, and if it is then, then at operation 310 the processing logic matches the type and name filters specified in the current task with that on the checker module and also on the property under verification. At operation 312, if all the filters match, then the processing logic applies the control on the current assertion, and if all the filters do not match, then the processing logic skips this step. At operation 314, the processing logic recursively applies on the hierarchy based on the level mentioned in the task, and at operation 316, it processes the next task.

In some embodiments, the assert control task includes assertions from functional verification parts (e.g., written in System Verilog) and bind with the language bind construct. System Verilog provides a powerful bind construct that is used to specify one or more instantiations of a module, interface, program, or checker without modifying the code of the target. So, for example, instrumentation code or assertions that are encapsulated in a module, interface, program, or checker can be instantiated in a target module or a module instance in a non-intrusive manner. Still, customized power aware checks, assertions, and monitors can be kept separate, not only from the design code but also from functional SVA.

UPF commands may be used to separate the binding of such customized power aware assertions from both functional System Verilog assertions (SVA) and the low-power design. For example, the UPF bind_checker command may allow a user to insert checker modules into a design without modifying and interfering with the original design code or introducing functional changes. However, UPF inherits the mechanism for binding the checkers to design instances from the System Verilog bind directives. Hence similar to SVA, the UPF bind_checker directive causes one module to be instantiated within another without having to explicitly alter the code of either. This can facilitate the complete separation between the design implementation and any associated verification code.

Signals in the target instance are bound by position to inputs in the bind checker module through the port list, exactly the same as in the case for SVA bindings. Thus, the bind module has access to any and all signals in the scope of the target instance by simply adding them to the port list, which facilitates sampling of arbitrary design signals.

VCS® NLP® takes in the same Verilog or VHDL RTL or gate-level netlist representation of the design as in standard flows and accepts the same test bench as in standard flows (optionally augmented for low-power checks). However, the native low-power flow requires power intent to be specified in a UPF format file, which is loaded into VCS® with the design and the test bench. VCS® NLP® reads this UPF, models the entire power network described in the UPF, and accurately understands the low-power policies and voltage events. VCS® NLP® produces a log file and an error and warnings report for all violations related to multi-voltage checks.

System Verilog provides the $assertcontrol system task to control the evaluation of various assertions. The $assertcontrol system task can also be used to control the execution of assertion action blocks associated with assertions and expect statements. This system task provides the capability to enable or disable or kill the assertions based on assertion type or directive type. Similarly, this task also provides the capability to enable/disable action block execution of assertions and expect statements based on assertion type or directive type. The violation reporting for unique, unique0, and priority_if and case constructs can also be controlled using these tasks. The arguments for the $assertcontrol system task can be described as follows:

Control_type: This argument controls the effect of the $assertcontrol system task. This argument can be an integer expression.

Assertion_type: This argument selects the assertion types and violation report types that are affected by the $assertcontrol system task. This argument can be an integer expression. Multiple assertion_type values can be specified at a time by OR-ing different values. For example, a task with assertion_type value of 3 can apply to concurrent and simple immediate assertions. Similarly, a task with assertion_type value of 96 can apply to unique and unique0 if and case constructs. If assertion_type is not specified, then it defaults to 255 and the system task applies to all types of assertions, expect statements, and violation reports.

Directive_type: This argument selects the directive types that are affected by the $assertcontrol system task. This argument can be an integer expression. This argument is checked only for assertions. Multiple directive_type values can be specified at a time by OR-ing different values. For example, a task with directive_type value of 3 can apply to assert and cover directives. If directive_type is not specified, then it defaults to 7 and the system task applies to all types of directives.

An example code (e.g., for a user interface) for a low-power design with finer control of low-power checkers using assertion control techniques of System Verilog Assertions (SVA) language is shown below:

```
UPF_assert_control_task::=
UPF_assert_task [(levels [, [list_of_scopes] [, [upf_ob-
    ject_type] [, [policy_name] [, [checker_mod_name]
    [,[assertion_name]]]]]])];
|UPF_assert_action_task [(levels [, [list_of_scopes] [,
    [upf_object_type] [, [policy_name] [, [checker_
    mod_name] [, [assertion_name]]]]]])];
|$upf_assert_control ([control_type], [assertion_type],
    [property_type], [, levels [, [list_of_scopes] [, [upf_ob-
    ject_type] [, [policy_name] [, [checker_mod_name] [,
    [assertion_name]]]]]]);
UPF_assert_task::=
$upf_asserton
|$upf_assertoff
|$upf_assertkill
UPF_assert_action_task::=
$upf_assertpasson
|$upf_assertpassoff
$upf_assertfailon
|$upf_assertfailoff
|$upf_assertnonvacuouson
|$upf_assertvacuousoff
levels::=integer_expression
list_of_scopes::=
hierarchical_identifi er {, hierarchical_identifi er}
| module_name
control_type::=integer_expression
assertion_type::=integer_expression
property_type::=integer_expression
upf_object_type::=integer_expression
policy_name::=simple_identifi er|empty_string
checker_mod_name::=simple_identifi er|empty_string
assertion_name::=simple_identifi er|empty_string
```

The example code may include a "levels" argument, which specifies the levels of hierarchy, consistent with the corresponding argument to the $dumpvars system task. The $dumpvars system task generates values of variables as and when the value changes throughout the simulation. If this argument is not specified, it defaults to 0, which may transitively include the entire hierarchy below the target scope or power top, whichever is applicable.

The example code may also include a "list_of_scopes" argument, which specifies which scopes of the model to control. It can be an absolute hierarchical path to target design instance or a named module block in the design where user has specified a UPF policy and associated a checker with that policy. If an isolation is specified for a boundary instance tb.top.inst, in order to control the checkers for those isolation cells, list_of_scopes should include the path tb.top.inst. It can also be a module name in the design where user wants to control all the checkers linked to a particular policy. This can be an optional argument, and if nothing is specified then it may be applicable on the entire design below the power top.

However, if due to some tool optimization the checker is instrumented inside power network hierarchy instead of design scope, then the tool should be able to automatically map it to equivalent scope in power network hierarchy and apply the assertion control intent. As an alternative to design paths, a user can also specify UPF domain level paths after specifying the UPF scopes. The top scope in this case, can be named as snps_ps_<power_top> (or some other special name) to distinguish it from regular absolute design paths. An example UPF may be provided as follows:
    set_design_top top
    set_design_attributes-models {bot}-attribute SNPS_reinit
        TRUE
    create_power_domain PD1
    create_power_domain PD2-elements {m1 m2}
    set_scope m3
    create_power_domain PD3
    set isolation iso1-domain PD3-isolation_signal iso_sig-
        clamp_value 0-applies_to inputs If the user wants to turn ON all LPA checkers associated to power switches in the domain PD3, then:
    >Absolute design level path: $asserton (0, top.m3, 4/*PSW*/);
    >UPF scope path: $asserton (0, snps_ps_top.m3.PD3, 4/*PSW*/); and
    >UPF scope path option #2: $asserton (0, snps_ps_top.m3.PD3.PSW).

If the user wants to turn OFF all LPA checkers associated to isolations in the domain PD2, then:
    >Absolute design level paths: $assertoff (0, top.m1, top.m2, 1/*ISO*/);
    >UPF scope path: $assertoff (0, snps_ps_top.PD2, 1/*ISO*/); and
    >UPF scope path option #2: $assertoff (0, snps_ps_top.PD2.ISO).

Here the advantage of UPF scope path is that the user can skip specifying all the domain boundary instances.

If the user wants to turn ON all LPA checkers which are associated to Power State Tables in the domain PD1, then:
    >Absolute design level paths: $asserton (1, top, 8/*PST*/);
    >UPF scope path: $asserton (1, snps_ps_top.PD1, 8/*PST*/); and
    >UPF scope path option #2: $assertoff (0, snps_ps_top.PD2.PST);

The example code may also include the following "control_type" values and effects:
    1=>Lock
    2=>Unlock
    3=>On
    4=>Off
    5=>Kill
    6=>PassOn
    7=>PassOff
    8=>FailOn
    9=>FailOff
    10=>NonvacuousOn
    11=>VacuousOff A control type specifies the type of control the user wants on the target assertions. It can be one of eleven (11) different types of control identified above. Two or more control types cannot be clubbed together in a single assertion control statement. This is a mandatory argument in $upf_assert_control task call.

The effect of the $assertcontrol system task is determined by the value of its first argument control_type, which can be an integer expression. The effect of the system task based on the value of control_type can be described as follows:

Lock: A value of 1 for this argument prevents status change of all specified assertions, expect statements, and violation reports until they are unlocked. Once an $assertcontrol with control_type of value 1 (Lock) is applied to an assertion, expect statement, or violation report, it becomes locked and no $assertcontrol can affect it until the locked state is removed by a subsequent $assertcontrol with a control_type value of 2 (Unlock).

Unlock: A value of 2 for this argument can remove the locked status of all specified assertions, expect statements, and violation reports.

On: A value of 3 for this argument can re-enable the execution of all specified assertions. A value of 3 for this argument can also re-enable violation reporting from all the specified violation report types. This control_type value does not affect expect statements.

Off: A value of 4 for this argument can stop the checking of all specified assertions until a subsequent $assertcontrol with a control_type of 3 (On). No new attempts can be started. Attempts that are already executing for the assertions, and their pass or fail statements, are not affected. In the case of a deferred assertion, currently queued reports are not flushed and may still mature, though further checking is prevented until a subsequent $assertcontrol with a control_type of 3 (On). In the case of a pending procedural assertion instance, currently queued instances are not flushed and may still mature, though no new instances may be queued until a subsequent $assertcontrol with a control_type of 3 (On). A value of 4 for this argument can also disable the violation reporting from all the specified violation report types. Currently queued violation reports are not flushed and may still mature, though no new violation reports can be added to the pending violation report queue until a subsequent $assertcontrol with a control_type value of 3 (On). The violation reporting can be re-enabled subsequently by $assertcontrol with a control_type value of 3 (On). This control_type value does not affect expect statements.

Kill: A value of 5 for this argument can abort execution of any currently executing attempts for the specified assertions and then stop the checking of all specified assertions until a subsequent $assertcontrol with a control_type of 3 (On). This also flushes any queued pending reports of deferred assertions or pending procedural assertion instances that have not yet matured. A value of 5 for this argument can also abort violation reporting from all the specified violation report types. Currently queued violation reports that have not yet matured are also flushed, and no new violation reports can be added to the pending violation report queue until a subsequent $assertcontrol with a control_type value of 3 (On). This control_type value does not affect expect statements.

PassOn: A value of 6 for this argument can enable execution of the pass action for vacuous and nonvacuous success of all the specified assertions and expect statements. An assertion that is already executing, including execution of the pass or fail action, is not affected. This control_type value does not affect violation report types.

PassOff: A value of 7 for this argument can stop execution of the pass action for vacuous and nonvacuous success of all the specified assertions and expect statements. Execution of the pass action for both vacuous and nonvacuous successes can be re-enabled subsequently by $assertcontrol with a control_type value of 6 (PassOn), while the execution of the pass action for only nonvacuous successes can be enabled subsequently by $assertcontrol with a control_type value of 10 (NonvacuousOn). An assertion that is already executing, including execution of the pass or fail action, is not affected. By default, the pass action is executed. This control_type value does not affect violation report types.

FailOn: A value of 8 for this argument can enable execution of the fail action of all the specified assertions and expect statements. An assertion that is already executing, including execution of the pass or fail action, is not affected. This task also affects the execution of the default fail action block. This control_type value does not affect violation report types.

FailOff: A value of 9 for this argument can stop execution of the fail action of all the specified assertions and expect statements until a subsequent $assertcontrol with a control_type value of 8 (FailOn). An assertion that is already executing, including execution of the pass or fail action, is not affected. By default, the fail action is executed. This task also affects the execution of default fail action block, i.e., $error, which is called in case no else clause is specified for the assertion. This control_type value does not affect violation report types.

NonvacuousOn: A value of 10 for this argument can enable execution of the pass action of all the specified assertions and expect statements on nonvacuous success. An assertion that is already executing, including execution of the pass or fail action, is not affected. This control_type value does not affect violation report types.

VacuousOff: A value of 11 for this argument can stop execution of the pass action of all the specified assertions and expect statements on vacuous success until a subsequent $assertcontrol with a control_type value of 6 (PassOn). An assertion that is already executing, including execution of the pass or fail action, is not affected. By default, the pass action is executed on vacuous success. This control_type value does not affect violation report types.

The example code may also include the following "assertion_type" values and type of assertions affected:

1=>Concurrent
2=>Simple Immediate
4=>Observed Deferred Immediate
8=>Final Deferred Immediate
16=>Expect
32=>Unique
64=>Unique0
128=>Priority An assertion type specifies the type of assertion that user wants to control. One can specify multiple assertion types by doing simple OR operation of individual assertion types. For example, if user specifies assertion_type as 3, that would mean, current assert control is applicable for both concurrent (1) and simple immediate assertions (2). This is a mandatory argument in $upf_assert_control task call.

The example code may also include the following "property_type" values and type of property affected:

1=>Assert
2=>Cover
4=>Assume

A property type specifies the type of property that the user may want to control. One can specify multiple property types by doing a simple OR operation of individual property types. For example, if user specifies property_type as 7, it would mean, current assert control is applicable for all types of properties, e.g. assert, cover, and assume. This is a mandatory argument in $upf_assert_control task call.

The example code may also include the following "upf_object_type" values and the associated type of lp_element (low-power element):

1=>ISO
2=>RET
4=>PSW
8=>PST
16=>PD

The UPF object type or lp_element specifies the type of low-power objects that user intends to control. One can specify multiple objects together by doing simple OR operation of individual types. For example, if user specifies object type as 31, that would mean user wants to control all five (5) types of UPF objects in the target scope. This is an optional argument for all UPF assertion control tasks. If unspecified, it would apply to all types of UPF objects.

The example code may also include a "policy_name" argument, which specifies the particular policy of type <policy_type> inside the target scope which can be controlled by current UPF assertion control task. This is an optional argument and follows policy_type argument. By default it applies to all policies of type <policy_type>. If an empty string expression is passed that would also apply to all policies to type current assert control may be applicable only for the named assertion in the current scope whose name matches with the one specified in this argument, provided it matches with the assertion_type and property_type requirements (in case of $upf_assert_control).

The example code may also include a "checker_mod_name" argument, which follows policy_name. For a given policy_type (31 for all types of policies) and policy name (an empty string for all policies of specified type), current assert control may be applicable only for the ones where the specified checker_mod is bound to. If an empty string is passed, then it may be applicable for all the checker modes which are bound to the current policy.

The example code may also include an "assertion_name" argument, and if it is specified, then the current assert control may be applicable only for the named assertion in the current scope whose name matches with the one specified in this argument, provided it matches with the assertion_type and property_type requirements (in case of $upf_assert_control).

The $assertoff assertion may be used to disable all assertions but allow currently active assertions to complete before being disabled. The $assertkill assertion may be used to kill and disable all assertions including currently active assertions. Similarly, the $asserton assertion may be used to turn all assertions back on.

Figure 4:
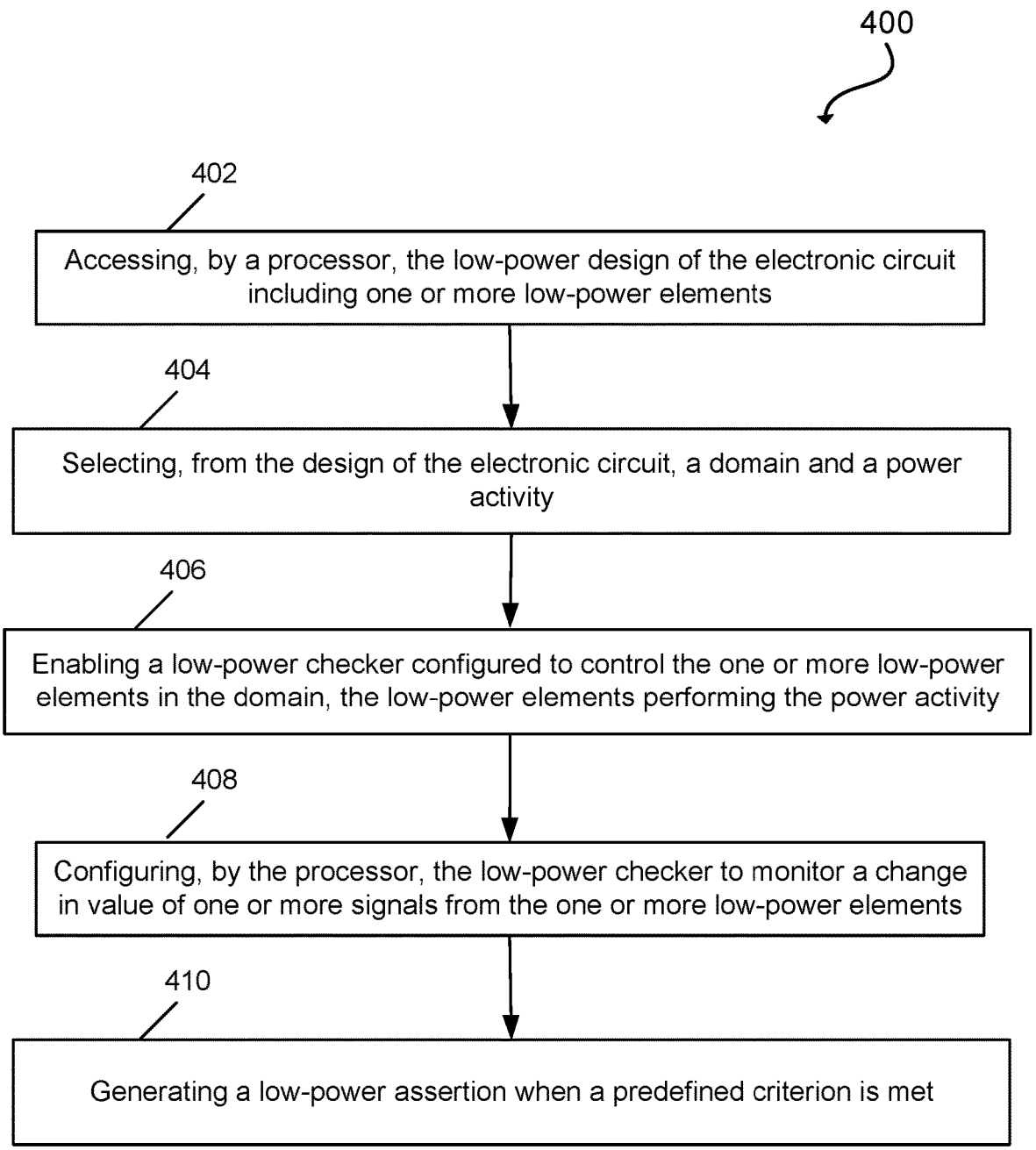
FIG. 4 illustrates example operations in a computer-implemented method for validation of a low-power design for an electronic circuit, in accordance with an embodiment of the present disclosure.

FIG. 4 illustrates example operations in a computer-implemented method 400 for validation of a low-power design for an electronic circuit, in accordance with an embodiment of the present disclosure. Method 400 may include a "power-aware" simulation that may be utilized to capture power results. The power-aware simulation may detect the power domains and their relations to the design files. The power-aware simulation is able to simulate the design behavior, taking into consideration the ON and OFF power domains and the power activities within the power domains. At operation 402, the method includes accessing, by a processor, the low-power design of the electronic circuit including one or more low-power elements. The one or more low-power elements may include a unified power format (UPF) object such as an isolation element, a retention element, a power switch, a power state table, or a power domain. At operation 404, the method includes selecting, from the design of the electronic circuit, a domain and a power activity that may be simulated as being performed by the low-power elements. In addition, the processor can select a simulation time, or any combination of the above. A power activity may include any activity performed by the low-power element in a domain. Some examples include isolation, retention, power switching, and power state table. For example, a power activity may include any activity that requires dynamic power, not including static power requirements of the low-power design, such as leakage. At operation 406, the method further includes enabling or disabling a low-power checker configured to control the one or more low-power elements in the domain while the low-power elements perform the power activity. Enabling or disabling a low-power checker/assertion may depend on the user and the user may enable or disable any particular assertion. For example, a user may only be interested about a particular hierarchy for their current debug session. Therefore, assertion pass/failure messages coming from other hierarchies may cause an inconvenience. So the user may want to disable certain type of checks/assertions in the design in that case. Similarly, the user may want to enable certain type of checks/assertions in the design while disabling other types of checks/assertions.

At operation 408, the method further includes configuring, by the processor, the low-power checker to monitor a change in value of one or more signals from the one or more low-power elements. The low-power checker can be a multi-voltage low power static rule checker that can validate that UPF low power design intent is accurately implemented and functions correctly. Low-power checks may include static checks and dynamic checks. Static checks detect architectural issues in the low-power design, such as a missing isolation or level shifter cell. There are two kinds of static checks: static RTL and static gate-level simulation (GLS) checks. The static RTL checks are run on RTL designs and static GLS checks on gate-level designs. Dynamic checks are performed on the design while running simulation. Dynamic checks detect behavioral issues in the design, such as incorrect power sequencing of power domains. The low-power checker disclosed may be able to perform, for example, isolation checks, level shifter checks, retention checks, back-to-back checks, and other checks. For example, if a low-power design has two power domains, PD_1 and PD_2, and a signal, s1, propagates from PD_1 to PD_2, during normal working conditions, that is when both power domains are powered-up, the signal s1 has either a 0 or 1 value. But when the power domain PD_1 is powered-down and PD_2 is powered-up, the value of signal s1 is unknown. This corrupts the powered-up logic in the PD_2 domain.

To avoid this, isolation cells may be placed between the outputs of the powered-down domain and the inputs of the powered-up domain. During normal working conditions, the isolation cell works as a buffer. However, when PD_1 is powered-down, the isolation cell clamps its output to either a 0 or 1 value. The isolation cell has an isolation enable signal that determines whether the isolation cell should provide isolation or work as a buffer.

Most designs have multiple power domains with numerous signals crossing these domains, which may lead to isolation issues. For level shifter checks, if a low-power design has two power domains, PD_3 and PD_4, and a signal, s2, propagates from PD_3 to PD_4, when both of the power domains are powered-up, and the voltage difference between the power domains is less than a threshold value (which can be set in the simulator), there are no issues in the design. However, if the voltage difference is greater than the threshold value, for example, PD_4 is operating at a higher-voltage level than PD_3, then a logic 1 at PD_3 can be assumed a logic 0 at PD_4. This leads to incorrect data transmission. To avoid this, a level shifter cell may be between the power domains. The level shifter cells convert high-voltage levels to low-voltage levels and vice versa. This enables correct data transmission between two different power domains. Similar to an isolation cell, a level shifter cell has a level shifter enable signal that determines whether the level shifter cell should convert the voltage levels or should work as a buffer.

At operation 410, the method includes generating a low-power assertion when a predefined criterion is met. In one example, the predefined criterion may include the change in value of one or more signals from the low-power elements resulting in a processor executing the low-power design using a predetermined amount of memory space. For example, a change in value of one or more signals from the low-power elements may result in the processor using up much more memory than the process originally requires. In another embodiment, the predefined criterion may include the change in value of one or more signals from the low-power elements resulting in a predetermined amount of processing time (e.g., the processor takes longer to perform a specific process than it should ideally take). In another embodiment, the predefined criterion may include the change in value of one or more signals from the low-power elements resulting in a predetermined amount of processing power (e.g., the processor uses more compute power to perform a specific process than it should ideally take). A few cases when the low-power checker throws an assertion include an isolation cell is required for a crossing, but it is neither present in the design nor specified in the UPF file. An isolation cell is not required for a crossing, but it is either present in the design or specified in the UPF file. An isolation cell is present in the design, but the corresponding strategy is not defined in the UPF file. An isolation strategy is specified in the UPF file, but an isolation cell is not present in the design. Two different clamp values are specified for an isolation cell in the UPF file. The isolation clamp value is different from the reset value of the flop. The clamp value of the isolation cell in the design does not match the corresponding strategy specified in the UPF file. The location of the isolation cell in the design does not match the location specified in the UPF file. The isolation control signal is not generated from an always-on region, or is unconnected, floating, or driven by constants. The isolation enable signal specified in the UPF file reaches the data pin of the isolation cell or does not reach the enable pin of the isolation cell. For an internally isolated IP pin, an isolation cell is present in the design or is specified in the UPF file. The isolation control signal is disabled when the source domain is powered-down and the sink domain is powered-up or when the source domain is in a corrupt state and the sink domain is not in a corrupt state. The isolation control signal is active when there is no requirement for isolation. The value at the output of an isolation cell is different from that at its input during normal working conditions or the value of the isolated port changes during the active isolation period.

Other examples include a level shifter cell is required for a crossing, but it is neither present in the design nor specified in the UPF file. A level shifter cell is not required for a crossing, but it is either present in the design or specified in the UPF file. A level shifter cell is present in the design, but the corresponding strategy is not defined in the UPF file. A level shifter strategy is specified in the UPF file, but a level shifter cell is not present in the design. The direction of the level shifter cell specified in the UPF file is not correct. For example, instead of a high-to-low level shifter cell, a low-to-high level shifter cell is specified. The location of the level shifter cell does not match with the location specified in the UPF file.

Additional examples where the low-power checker may throw an assertion include where a retention cell is required, but it is neither present in the design nor specified in the UPF file. A retention cell is not required (as the power domain is an always-on domain), but it is either present in the design or specified in the UPF file. A retention cell is present in the design, but it does not have the corresponding strategy defined in the UPF file. A retention strategy is specified in the UPF file, but a retention cell is not present in the design. The retention condition is not asserted when the power domain is powered-down. The retention control signal is not generated from an always-on domain, or is unconnected, or is driven by a constant. The retention condition is disabled at power down or power up. The retention condition toggles at power down.

The low-power assertion can be described in System Verilog Assertions (SVA), VHDL, Verilog, SystemC, MyHDL, Property Specification Language (PSL), or Open Verilog Library (OVL). The low-power assertion may include at least one of lock, unlock, on, off, kill, passOn, passOff, failOn, failOff, vacuousOff, or NonvacuousOff. The method may further include enabling, by the processor, the low-power checker in a power domain during a first power activity, and disabling the same low-power checker in the power domain during a second power activity.

The following examples are purely illustrative of the functioning of the above arguments in the example code for a low-power design with finer control of low-power checkers using assertion control techniques of System Verilog Assertions (SVA) language:

Example-1

=============== initial begin
$upf_assertoff (0, tb.top.inst, 3); //At time 0, disable all assertions inside the checker modules applied on ISO and RET policies (3) which are present inside the design scope tb.top.inst and hierarchy below it (0)
10;
$upf_asserton (0, tb.top.inst, 1); //At time 10, enable all assertions inside the checker modules applied on ISO policies (1) which are present inside the design scope tb.top.inst and hierarchy below it (0)
5;
$upf_asserton (0, tb.top.inst, 2); ////At time 15, enable all assertions inside the checker modules applied on RET policies (2) which are present inside the design scope tb.top.inst and hierarchy below it (0)
end Example-2

=============== initial begin
$upf_assert_control (4, 2, 1, 0, tb.top.inst, 3); //At time 0, disable (4) all simple immediate (2) assert properties (1) inside the checker modules applied on all ISO and RET policies (3) which are present inside the design scope tb.top.inst and its below hierarchy (0)
10;
$upf_assert_control (3, 2, 1, 0, tb.top.inst, 1, "iso1", "chk_mod1", "A1"); //At time 10, enable (3) simple immediate (2) assert properties (1) named "A1" inside the checker module "chk_mod1" which is applied on ISO policy (1) whose policy name is "iso1" and which are present inside the design scope tb.top.inst and its below hierarchy (0)
5;
$upf_assert_control (3, 2, 1, 0, tb.top.inst, 2, "ret1", "chk_mod2", "A2"); //At time 15, enable (3) simple immediate (2) assert properties (1) named "A2" inside the checker modules "chk_mod2" which is applied on RET policy (2) whose policy name is "ret1" and which are present inside the design scope tb.top.inst and its below hierarchy (0)
end

Example-3

```
initial begin
$upf_assert_control (4, 2, 1, 0, tb.top.inst, 3); //At time 0,
    disable (4) all simple immediate (2) assert properties
    (1) inside the checker modules applied on all ISO and
    RET policies (3) which are present inside the design
    scope tb.top.inst and its below hierarchy (0)
#10;
$upf_assert_control (3, 2, 1, 0, tb.top.inst, 1, "iso1"); //At
    time 10, enable (3) all simple immediate (2) assert
    properties (1) inside the checker modules applied on all
    ISO policy (1) whose policy name is "iso1" and which
    are present inside the design scope tb.top.inst and its
    below hierarchy (0)
#5;
$upf_assert_control (3, 2, 1, 0, tb.top.inst, 2, "ret1"); //At
    time 15, enable (3) all simple immediate (2) assert
    properties (1) inside the checker modules applied on all
    RET policies (2) whose policy name is "ret1" and
    which are present inside the design scope tb.top.inst
    and its below hierarchy (0)
end
```

Example-4

```
initial begin
$upf_assert_control (4, 2, 1, 0, tb.top.inst, 3); //At time 0,
    disable (4) all simple immediate (2) assert properties
    (1) inside the checker modules applied on all ISO and
    RET policies (3) which are present inside the design
    scope tb.top.inst and its below hierarchy (0)
#10;
$upf_assert_control (3, 2, 1, 0, tb.top.inst, 1, "iso1",
    "chk_mod1", "A1"); //At time 10, enable (3) simple
    immediate (2) assert properties (1) named "A1" inside
    the checker module "chk_mod1" which is applied on
    ISO policy (1) whose policy name is "iso1" and which
    are present inside the design scope tb.top.inst and its
    below hierarchy (0)
#5;
$upf_assert_control (3, 2, 1, 0, tb.top.inst, 2, "ret1",
    "chk_mod2", "A2"); //At time 15, enable (3) simple
    immediate (2) assert properties (1) named "A2" inside
    the checker modules "chk_mod2" which is applied on
    RET policy (2) whose policy name is "ret1" and which
    are present inside the design scope tb.top.inst and its
    below hierarchy (0)
end
```

Figure 5:
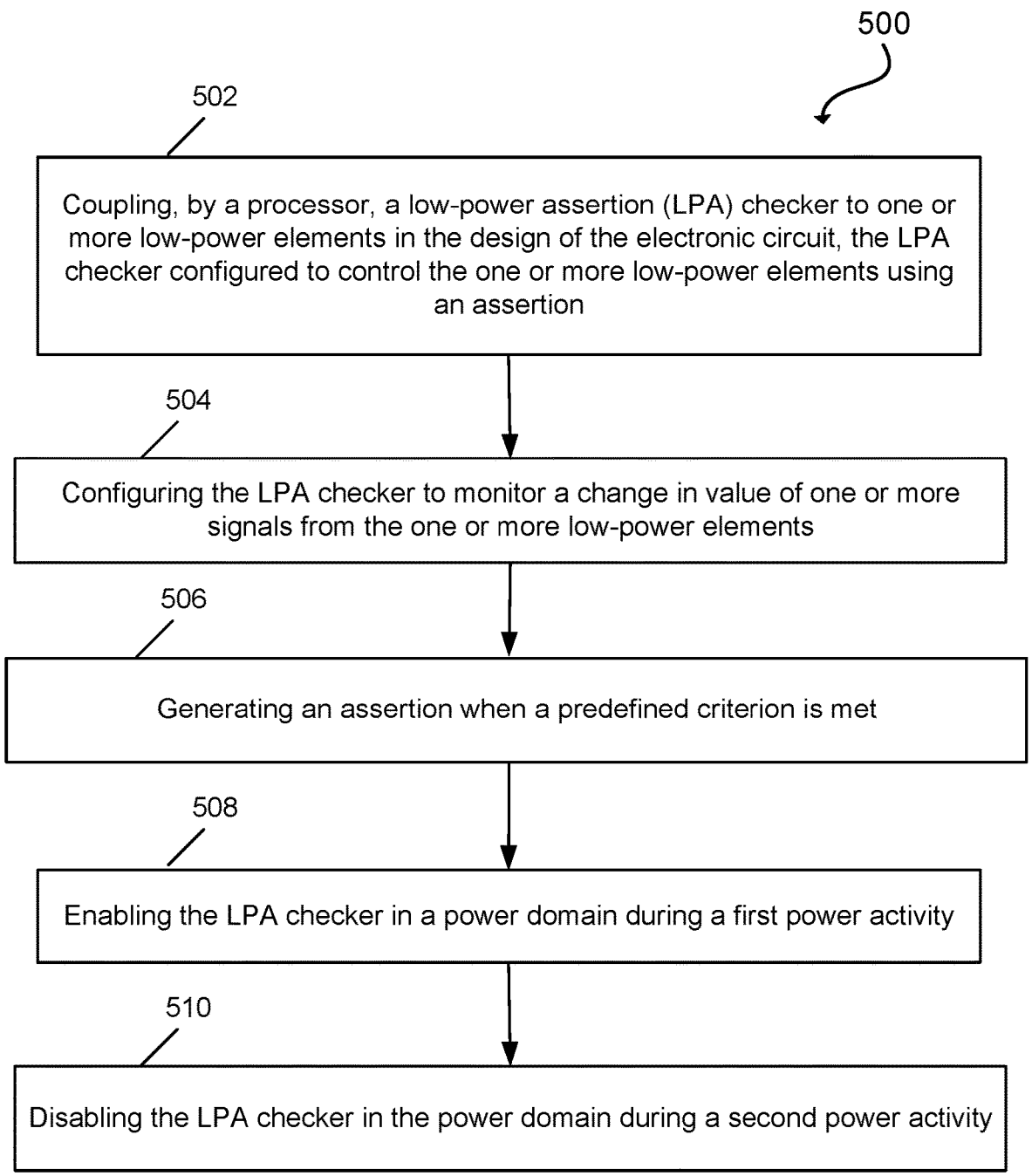
FIG. 5 illustrates example operations in a computer-implemented method for assisting verification of a low-power design of an electronic circuit, in accordance with an embodiment of the present disclosure.

FIG. 5 illustrates example operations in a computer-implemented method 500 for assisting verification of a low-power design of an electronic circuit, in accordance with an embodiment of the present disclosure. At operation 502, the method may include coupling or attaching, by a processor, a low-power assertion (LPA) checker to one or more low-power elements in the design of the electronic circuit in order to monitor a change in value of a signal associated with the low-power elements. The LPA checker may be configured to control the one or more low-power elements using a low-power assertion. The electronic circuit may be that of a system-on-chip (SoC) and/or an IP module. The SoC may include different components which are often referred to as IP modules. Examples of IP modules include processors (e.g., microprocessor, microcontroller, digital signal processor, video processor, audio processor, specialized co-processors, etc.) or components or functions of processors (e.g., Wallace tree, multiplier, BitBlit which is a graphics operation that merges two bit-map images, etc.), memories and memory management unit (including cache, flash controllers, content addressable memory, or other types of dedicated data storage), and input/output and communication components (e.g., USB, PCIE, I2C, SATA, wireless, Ethernet, peripherals drivers, etc.).

At operation 504, the method may include configuring the LPA checker to monitor a change in value of one or more signals from the one or more low-power elements. For example, the LPA checker can be a multi-voltage low power static rule checker that can validate that UPF low power design intent is accurately implemented and functions correctly. Low-power checks may include static checks and dynamic checks. Static checks detect architectural issues in the low-power design, such as a missing isolation or level shifter cell. There are two kinds of static checks: static RTL and static gate-level simulation (GLS) checks. The static RTL checks are run on RTL designs and static GLS checks on gate-level designs. Dynamic checks are performed on the design while running simulation. Dynamic checks detect behavioral issues in the design, such as incorrect power sequencing of power domains. The LPA checker may be able to perform, for example, isolation checks, level shifter checks, retention checks, back-to-back checks, and other checks, described above. The one or more low-power elements may include a unified power format (UPF) object such as an isolation element, a retention element, a power switch, a power state table, or a power domain. At operation 506, the method may include generating the low-power assertion when a predefined criterion is met. In one example, the predefined criterion may include the change in value of one or more signals from the low-power elements resulting in a processor executing the low-power design using a predetermined amount of memory space. For example, a change in value of one or more signals from the low-power elements may result in the processor using up much more memory than the process originally requires. In another embodiment, the predefined criterion may include the change in value of one or more signals from the low-power elements resulting in a predetermined amount of processing time (e.g., the processor takes longer to perform a specific process than it should ideally take). In another embodiment, the predefined criterion may include the change in value of one or more signals from the low-power elements resulting in a predetermined amount of processing power (e.g., the processor uses more compute power to perform a specific process than it should ideally take). The low-power assertion can be described in System Verilog Assertions (SVA), VHDL, Verilog, SystemC, MyHDL, Property Specification Language (PSL), or Open Verilog Library (OVL). The low-power assertion may include at least one of lock, unlock, on, off, kill, passOn, passOff, failOn, failOff, vacuousOff, or NonvacuousOff.

At operation 508, the method may further include enabling or disabling, by the processor, the low-power checker in a power domain during a first power activity. A power activity may include any activity performed by the low-power element in a domain. Some examples include isolation, retention, power switching, and power state table. A power state table (PST) defines the relationship between operational voltages of the domains, and all legal voltage states and power state combinations for a design, including dynamic voltage scaling (DVS) and shutdown scenarios. At operation 510, the method may include disabling the same low-power checker in the power domain during a second power activity. Enabling or disabling a low-power checker/assertion may depend on the user and the user may enable or disable any particular assertion. For example, a user may only be interested about a particular hierarchy for their current debug session. Therefore, assertion pass/failure messages coming from other hierarchies may cause an inconvenience. So the user may want to disable certain type of checks/assertions in the design in that case. Similarly, the user may want to enable certain type of checks/assertions in the design while disabling other types of checks/assertions.

Advantages of the present disclosure include simulation speed enhancement, as both find_checker based approach and UCLI based approach compromise on simulation speed. Another advantage includes improved debug productivity for the user, as they may be able to process and verify more focused and concise data compared to a bloated simulation log of violations. Another advantage includes shift-left verification, as the present disclosure provides a way to pass the low-power assertion control intent much early e.g., as part of test bench or design under test (DUT) code compared to existing UCLI/find_checker based flows where user has to provide the intent at runtime. If there is any discrepancy between the assert control intent and LPA checker specification, user may get notified about it earlier, at compile time. Additionally, the disclosed methods and systems provide intelligent verification, as they can work on generic paths to target scope and resolve on the fly based on the outcome of low-power analysis.

VCS® NLP® performs power aware simulation with a complete understanding of the UPF-defined power network, at RTL prior to implementation. This uniquely allows engineers to comprehensively verify correct behavior of designs that use advanced voltage control techniques for power management and catch potentially expensive low-power bugs very early in the design process.

Other advantages include catching LP bugs early and quickly with accurate simulation of designs using advanced low-power techniques, including Power Gating and Retention. Additionally, voltage-level aware simulation accurately verifies designs with Low-VDD Standby and DVS. The above methods also provide the infrastructure to model and correctly simulate Multi-Rail macros leads to increased bug detection for multi-voltage designs. Additionally, built-in, automated assertions derived from analysis of the design and power intent mitigate the risk of undetected bugs and increase verification productivity.

Figure 6:
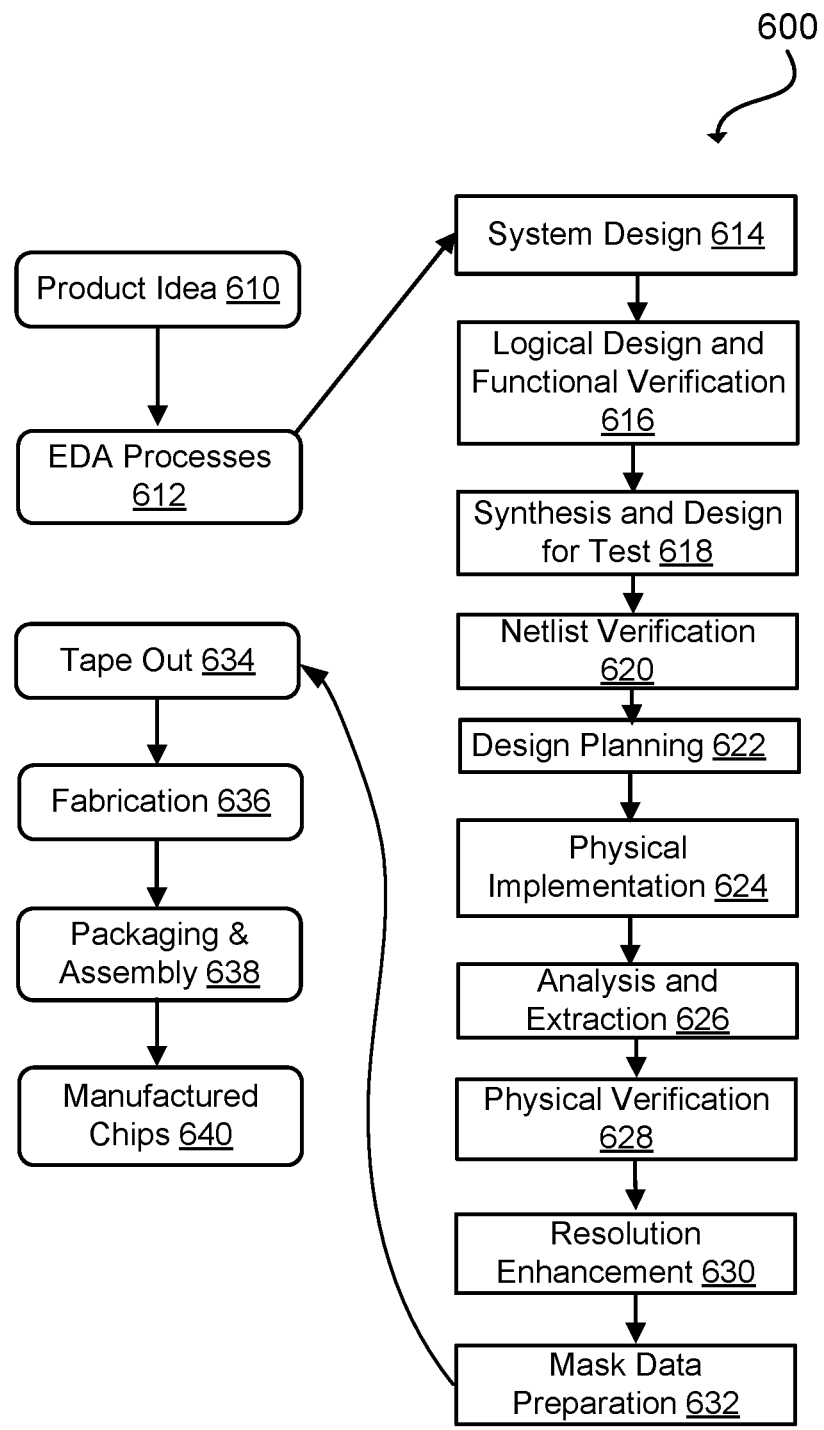
FIG. 6 depicts a flowchart of various processes used during the design and manufacture of an integrated circuit in accordance with some embodiments of the present disclosure.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes can start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die can be fabricated 636 and packaging and assembly processes 638 can be performed to produce the finished integrated circuit 640.

Specifications for a circuit or electronic structure may range from low-level transistor material layouts to high-level description languages. A high-level of abstraction may be used to design circuits and systems, using a hardware description language ('HDL') such as VHDL, Verilog, System Verilog, SystemC, MyHDL or Open Vera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which can be used for detailed descriptions of circuits with many analog components. Descriptions at each level of abstraction are enabled for use by the corresponding tools of that layer (e.g., a formal verification tool). A design process may use a sequence depicted in FIG. 6. The processes described herein can be enabled by EDA products (or tools).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit can be specified in one or more description languages and the specification can be checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' can be used to speed up the functional verification.

During synthesis and design for test 618, HDL code can be transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist can be checked for compliance with timing constraints and for correspondence with the HDL code. During design planning 622, an overall floor plan for the integrated circuit can be constructed and analyzed for timing and top-level routing.

During layout or physical implementation 624, physical placement (positioning of circuit components such as transistors or capacitors) and routing (connection of the circuit components by multiple conductors) can occur, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flip-flop or latch). As used herein, a circuit 'block' may refer to two or more cells. Both a cell and a circuit block can be referred to as a module or component and can be enabled as both physical structures and in simulations. Parameters can be specified for selected cells (based on 'standard cells') such as size and made accessible in a database for use by EDA products.

During analysis and extraction 626, the circuit function can be verified at the layout level, which permits refinement of the layout design. During physical verification 628, the layout design can be checked to ensure that manufacturing constraints are correct, such as DRC constraints, electrical constraints, lithographic constraints, and that circuitry function matches the HDL design specification. During resolution enhancement 630, the geometry of the layout can be transformed to improve how the circuit design is manufactured.

During tape-out, data can be created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

Figure 7:
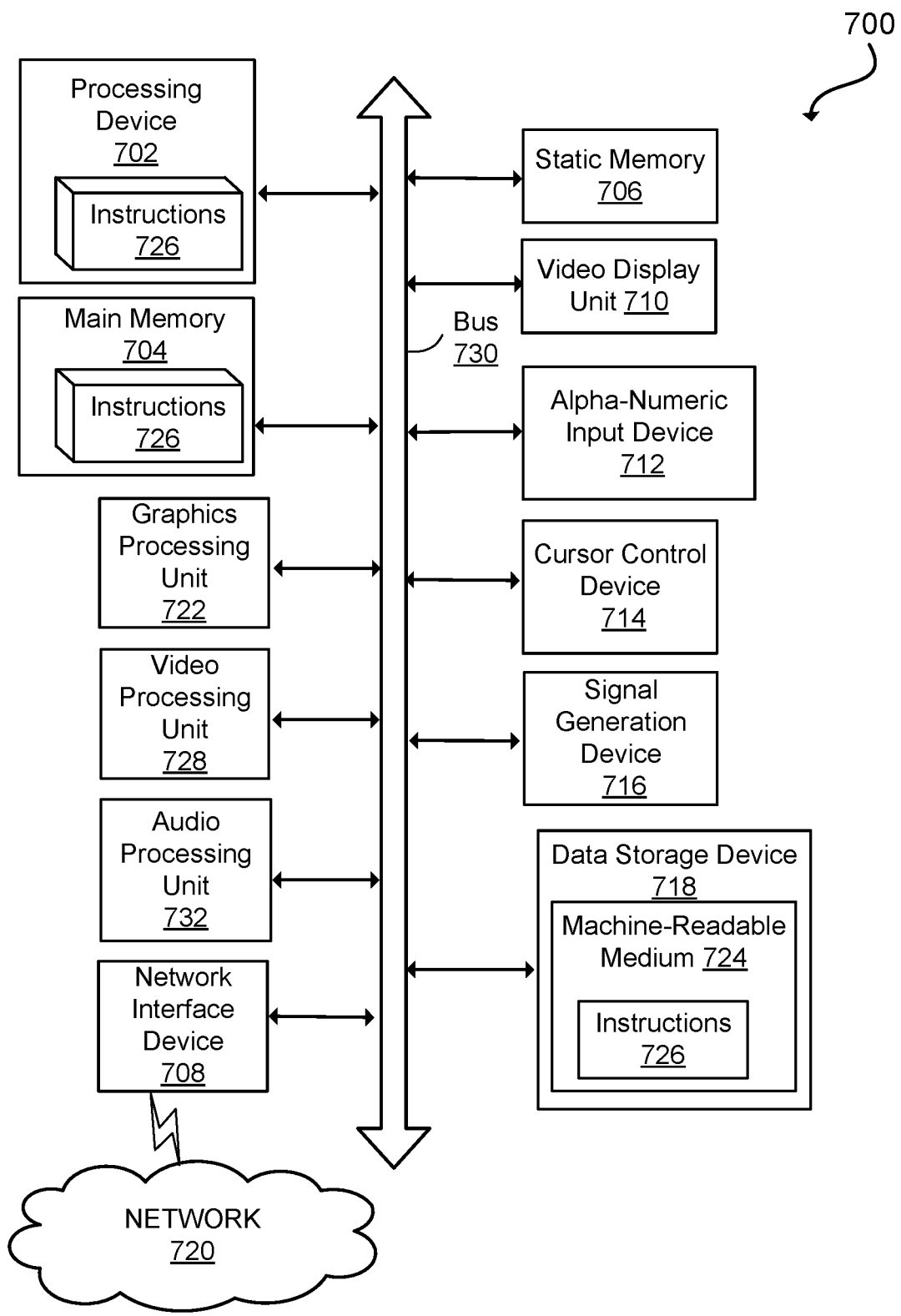
FIG. 7 depicts a diagram of an example computer system in which embodiments of the present disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one embodiment, the non-transitory computer readable medium may include instructions 726 which when executed by a processing device (e.g., processing device 702), cause the processing device to generate a digital representation of a level-shifting circuit. The level-shifting circuit may include a level shifter configured to receive a first clock signal associated with a first power level (VDDP) and generate a second clock signal associated with a second power level (VDDA). The second power level may be greater than the first power level. The level-shifting circuit may further include an input clock buffer including a first input including the second clock signal from the level shifter, and a second input coupled in parallel to the first input; the second input including the first clock signal. In one embodiment, the first power level includes a peripheral voltage and the second power level includes a bitcell array voltage. The input clock buffer may be configured to generate an output clock signal when a difference between the second power level and the first power level is above a determined threshold voltage, and generate the output clock signal when the difference between the second power level and the first power level is below the determined threshold voltage. The output clock signal may be provided as inputs to a memory periphery and a memory timer, and the memory periphery and memory timer may be coupled in parallel to the input clock buffer.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It may be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It may be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for validation of a low-power design for an electronic circuit, the method comprising:
   accessing, by a processing device, the low-power design of the electronic circuit comprising one or more low-power elements;
   selecting, from the design of the electronic circuit, a domain and a power activity;
   upon detecting an initiation of the power activity, selectively enabling or disabling an assertion component configured to control the one or more low-power elements in the domain, the low-power elements performing the power activity;
   upon enabling the assertion component, configuring, by the processing device, the assertion component to monitor a change in value of one or more signals from the one or more low-power elements; and
   generating an assertion when a defined criterion is met.

2. The method of claim 1, wherein the one or more low-power elements comprise a unified power format (UPF) object comprising one or more of an isolation element, a retention element, a power switch, a power state table, or a power domain.

3. The method of claim 1, wherein the defined criterion comprises the change in value resulting in the processing device using a determined amount of memory space, a determined amount of processing time, or a determined amount of processing power.

4. The method of claim 1, wherein the assertion is described in at least one of System Verilog Assertions (SVA), VHDL, Verilog, SystemC, MyHDL, Property Specification Language (PSL), or Open Verilog Library (OVL).

5. The method of claim 1, further comprising:
   enabling, by the processing device, the assertion component in a power domain during a first power activity; and
   disabling the assertion component in the power domain during a second power activity.

6. The method of claim 1, wherein the assertion comprises at least one of lock, unlock, on, off, kill, passOn, passOff, failOn, failOff, vacuousOff, or NonvacuousOff.

7. The method of claim 1, wherein the electronic circuit comprises at least one of a system-on-chip (SoC) or an IP module.

8. A non-transitory computer-readable medium storing program instructions executable by a processing device, causing the processing device to perform operations comprising:
   accessing a low-power design of an electronic circuit comprising one or more low-power elements;
   selecting, from the design of the electronic circuit, a domain and a power activity; and
   upon detecting an initiation of the power activity, selectively enabling or disabling an assertion component configured to control the one or more low-power elements in the domain, the low-power elements performing the power activity;

upon enabling the assertion component, configuring, by the processing device, the assertion component to monitor a change in value of one or more signals from the one or more low-power elements; and generating an assertion when a defined criterion is met.

9. The non-transitory computer-readable medium of claim 8, wherein the one or more low-power elements comprise a unified power format (UPF) object comprising one or more of an isolation element, a retention element, a power switch, a power state table, or a power domain.

10. The non-transitory computer-readable medium of claim 8, wherein the defined criterion comprises the change in value resulting in the processing device using a determined amount of memory space, a determined amount of processing time, or a determined amount of processing power.

11. The non-transitory computer-readable medium of claim 8, wherein the assertion is described in at least one of System Verilog Assertions (SVA), VHDL, Verilog, SystemC, MyHDL, Property Specification Language (PSL), or Open Verilog Library (OVL).

12. The non-transitory computer-readable medium of claim 8, wherein the instructions further cause the processing device to perform operations comprising:

enabling, by the processing device, the assertion component in a power domain during a first power activity; and disabling the assertion component in the power domain during a second power activity.

13. The non-transitory computer-readable medium of claim 8, wherein the assertion comprises at least one of lock, unlock, on, off, kill, passOn, passOff, failOn, failOff, vacuousOff, or NonvacuousOff.

14. A computer-implemented method for assisting verification of a design of an electronic circuit, the method comprising:

coupling, by a processing device, a low-power assertion (LPA) checker to one or more low-power elements in the design of the electronic circuit, the LPA checker configured to control the one or more low-power elements using a low-power assertion, wherein the LPA checker comprises an assertion component, and wherein the LPA checker is selectively enabled or disabled upon detecting an initiation of a power activity;

upon enabling the LPA checker, configuring the LPA checker to monitor a change in value of one or more signals from the one or more low-power elements; and generating the low-power assertion when a defined criterion is met.

15. The computer-implemented method of claim 14, wherein the one or more low-power elements comprise a unified power format (UPF) object comprising at least one of an isolation element, a retention element, a power switch, a power state table, or a power domain.

16. The computer-implemented method of claim 14, wherein the defined criterion comprises the change in value resulting in the processing device using a determined amount of memory space, a determined amount of processing time, or a determined amount of processing power.

17. The computer-implemented method of claim 14, wherein the low-power assertion is described in at least one of System Verilog Assertions (SVA), VHDL, Verilog, SystemC, MyHDL, Property Specification Language (PSL), or Open Verilog Library (OVL).

18. The computer-implemented method of claim 14, further comprising:

enabling the LPA checker in a power domain during a first power activity; and disabling the LPA checker in the power domain during a second power activity.

* * * * *